Patented Oct. 1, 1946

2,408,609

UNITED STATES PATENT OFFICE 2,408,609

RESINS OF HIGH CHLORINE CONTENT

Oliver W. Cass, Niagara Falls, N. Y., assignor to E. I. du Pont de Nemours & Company, Wilmington, Del., a corporation of Delaware No Drawing. Application May 24, 1943, Serial No. 488,215

2 Claims. (Cl. 260—86)

This invention relates to the preparation of certain new and useful chlorine-containing resinous materials. More particularly, it relates to the preparation of new and valuable resins by introducing chlorine into resins previously prepared by copolymerizing vinyl chloride and trichlorethylene.

In my copending application, Serial No. 488,213 filed contemporaneously herewith, I have disclosed the preparation of new and valuable resins by copolymerizing vinyl chloride and trichlorethylene. As disclosed in that application, the amount of trichlorethylene present in the monomeric material subjected to copolymerization should normally range from 1 to 5% by weight. Copolymeric resins of the most satisfactory character, as described in said copending application, are ordinarily prepared by copolymerizing a mixture of vinyl chloride and trichlorethylene wherein the trichlorethylene content ranges from 1.5% to 3%.

I have now found that resins prepared by the copolymerization of trichlorethylene and vinyl chloride as disclosed in said copending application can be much improved in character, especially as regards their heat stabilities, by chlorinating the copolymeric resins so that they are of increased chlorine content. For best results I have found that the resins prepared by copolymerizing vinyl chloride and trichlorethylene should be chlorinated to a chlorine content falling within the range 64% to 66% by weight. In addition to improved heat stability, the chlorinated resinous materials are characterized by increased solubility in the common lacquer solvents such as aromatic hydrocarbons, and by increased softening temperature. The copolymers of vinyl chloride and trichlorethylene, as described in my copending application, generally have softening temperatures within the range 70 to 80° C., whereas by the incorporation of additional chlorine to yield a resinous product of 64% or over chlorine content the softening temperature is increased to one in the range 109 to 120° C. Improved heat stability, higher softening temperature, and greater solubility in common solvents are all properties of considerable value and importance where the resin is employed as a coating material.

Accordingly, it is one of the objects of this invention to prepare resins of the vinyl chloride-trichlorethylene copolymer type which resins will exhibit elevated softening temperature, improved heat stability, and increased solubility in the common lacquer solvents. Another object of this invention is to secure these improved properties with resins of the vinyl chloride-trichlorethylene copolymer type by incorporating additional chlorine in these resinous products. These and still further objects will be apparent from the ensuing disclosure of certain preferred embodiments of my invention.

In incorporating additional chlorine into the copolymeric resins prepared by copolymerizing vinyl chloride and trichlorethylene, ordinarily I prefer to feed chlorine gas into a suspension of the copolymer in any suitable organic liquid. If desired, water in small amounts may be present in the slurry or suspension of the copolymer in the organic liquid, as I have found that a small amount of water under these circumstances functions as catalyst and renders chlorination more rapid and efficient.

As an illustration, it is possible to suspend the copolymer of trichlorethylene and vinyl chloride in an organic liquid such as carbon tetrachloride and supply chlorine gas thereto, actinic radiation being supplied to the reactants by placing a light source in contact with the suspension or slurry. From time to time samples of the product may be withdrawn and tested to determine chlorine content. At the beginning it is desirable to heat the suspension or slurry in order to initiate the reaction, but as the reaction proceeds exothermically during the latter stages cooling is usually essential in order to maintain a temperature low enough to prevent excessive losses of material by vaporization. At the conclusion of the reaction the reaction mixture may be blown with air to free it from hydrogen chloride and chlorine, and the chlorinated copolymeric material precipitated by the addition of a precipitating agent such as methanol. It is then recovered by filtration and dried in the usual manner.

As examples of my process for preparing new and valuable polymeric materials of increased chlorine content, the following are illustrative.

Example I

A copolymer of vinyl chloride and trichlorethylene, the trichlorethylene constituting 1.5% of the monomeric material copolymerized, was prepared by following the procedure described in Example 1 of my copending application, Serial No. 488,213 filed May 24, 1943. This involved subjecting the monomeric mixture to copolymerization at a temperature within the range 40 to 50° C., there being present, as polymerization catalyst, ammonium persulfate and sodium bisulfite. The copolymerization was complete after somewhat over three hours, whereupon the copolymer of vinyl chloride containing 1.5% trichlorethylene was recovered from the autoclave in which the copolymerization was carried out.

400 parts of this copolymeric material and 5,314 parts by weight of carbon tetrachloride were then placed in a suitable glass-lined vessel equipped with a stirrer, a reflux condenser, a thermometer well and thermometer, a light well, and an inlet tube for introducing chlorine. Actinic radiation was supplied by the light of an ordinary tungsten filament lamp placed in the light well.

The contents of the reaction vessel were then heated to approximately 60° C. in order to initiate the reaction. Chlorine was introduced into the stirred suspension of copolymer, and chlorination continued until a total of 111 parts by weight of hydrogen chloride has been evolved. The reaction mixture was then blown with air until substantially free from hydrogen chloride and chlorine.

The chlorinated coplymer was then isolated by the addition of methanol as a precipitant to the reaction mixture. This resulted in the formation of a fine, easily filtered powder which was recovered from the methanol-carbon tetrachloride mixture by filtration. In this way there were recovered 485 parts by weight of a chlorinated copolymer of vinyl chloride and trichlorethylene, this chlorinated material analyzing 65.9% chlorine.

Moldings of this chlorinated copolymeric material were prepared at 165° C. and compared with moldings of the unchlorinated copolymer prepared at the same temperature. Moldings of the chlorinated polymer containing 65.9% chlorine were light yellow in color, while moldings of the unchlorinated copolymer were jet black in color. Moreover, in the latter case, the chromium-plated surfaces of the molding equipment had been severely attacked by the copolymer, while no evidence of attack was noticeable in the case of the chlorinated resin containing 65.9% chlorine. The solubility and ease of solution of the chlorinated copolymer in various solvents were clearly superior to those of the unchlorinated copolymer. Moreover, coatings of the chlorinated copolymer deposited upon steel strips were of improved character, both as regards flexibility and adherence, as well as in regard to resistivity to the action of moisture, acids and alkalies.

*Example II*

The copolymer of Example 2 of my previously referred to copending application was prepared, utilizing as monomeric material a mixture of vinyl chloride and trichlorethylene containing 3% of trichlorethylene. This was copolymerized for four hours and twenty minutes at an elevated temperature.

The copolymer thus resulting was chlorinated after suspension in carbon tetrachloride by the introduction of chlorine gas, following the procedure described in Example I, until a chlorinated copolymer containing 64.5% of chlorine was secured. This material was readily soluble at room temperature to the extent of 33%, without difficulty, in mixed solvents such as one comprising 60% of methyl ethyl ketone and 40% toluene. Films deposited on a steel plate from this solution were characterized by the desirable properties enumerated in Example I.

The products obtained in accordance with this invention are useful for many purposes in the lacquer industry, and may be generally employed for impregnating and insulating purposes. They may be employed either alone or in combination with other resinous products.

As various changes may be made in the preferred procedure as described without departing from the scope of my invention, it is intended that it shall be construed in accordance with the appended claims.

I claim:

1. A polymeric product obtained by the chlorination of a copolymer of vinyl chloride and trichlorethylene prepared by copolymerization of a monomeric mixture containing between 1% and 5% by weight of trichlorethylene and the remainder of said mixture being vinyl chloride, said polymeric product, as a result of said chlorination, having an increased percentage content of chlorine and an increased resistance to darkening at elevated temperatures.

2. A polymeric product obtained by the chlorination of a copolymer of vinyl chloride and trichlorethylene prepared by copolymerization of a monomeric mixture containing between 1% and 5% by weight of trichlorethylene and the remainder of said mixture being vinyl chloride, said polymeric product, as a result of said chlorination having a chlorine content of between 64% and 66%, and having an increased resistance to darkening at elevated temperatures.

OLIVER W. CASS.